Aug. 24, 1948.  R. H. COLWILL  2,447,932
CENTERIMETER
Filed April 9, 1945  2 Sheets-Sheet 1
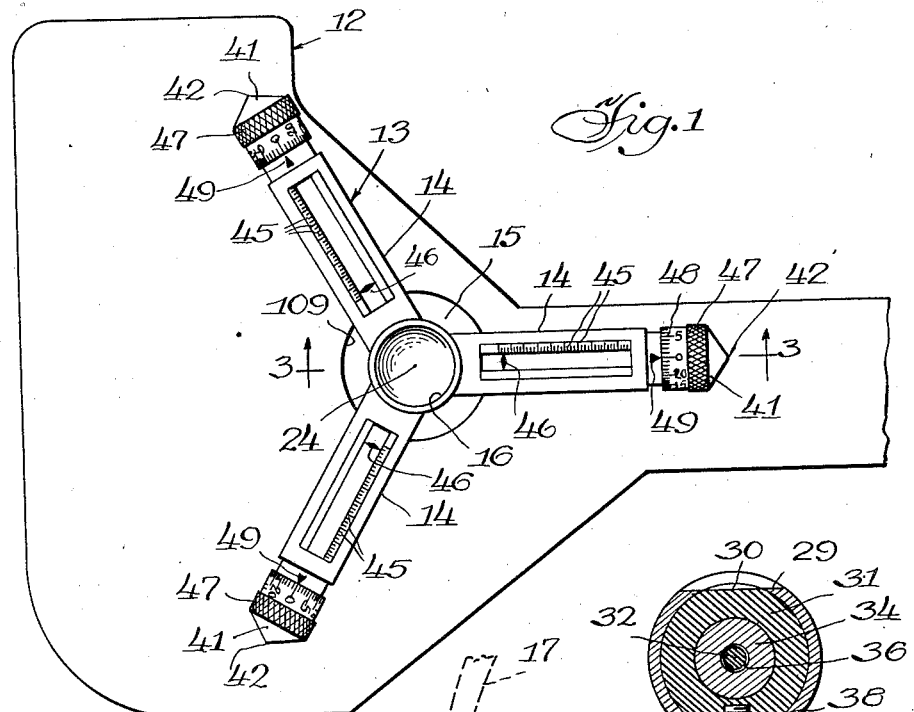
Fig.1
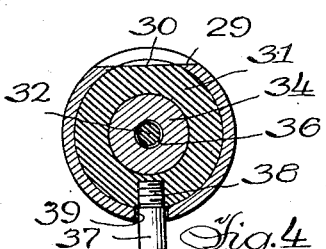
Fig.4
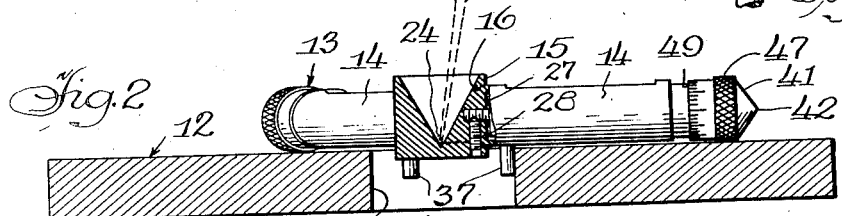
Fig.2
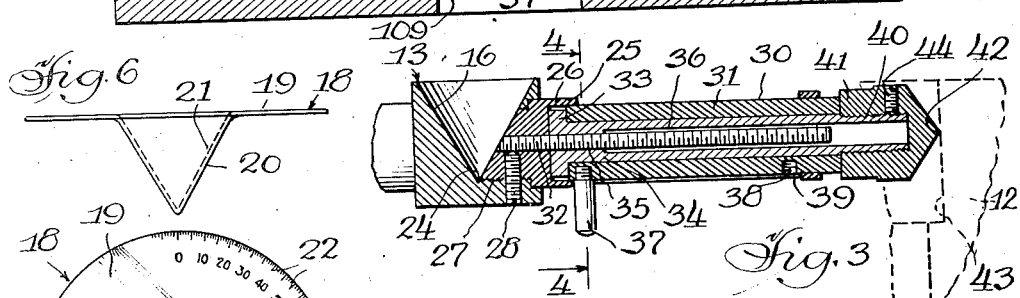
Fig.3
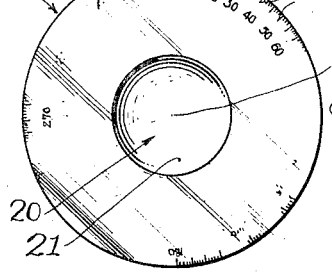
Fig.6
Fig.5
INVENTOR.
Richard H. Colwill
BY
David Manley Heller.
Attorney.

Aug. 24, 1948.   R. H. COLWILL   2,447,932
CENTERIMETER
Filed April 9, 1945   2 Sheets-Sheet 2
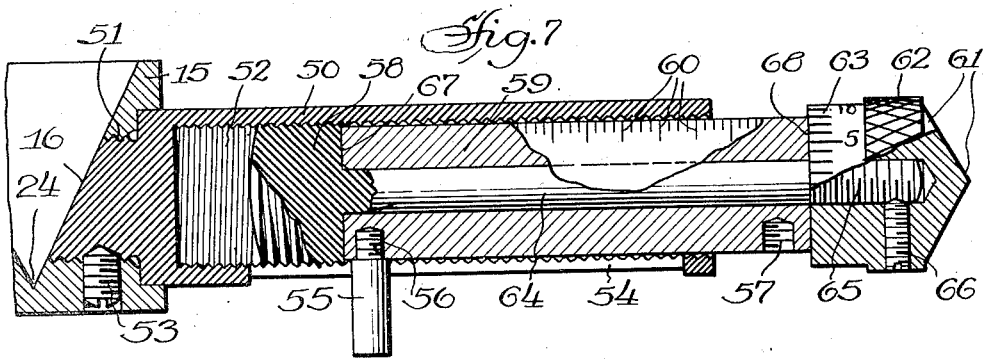
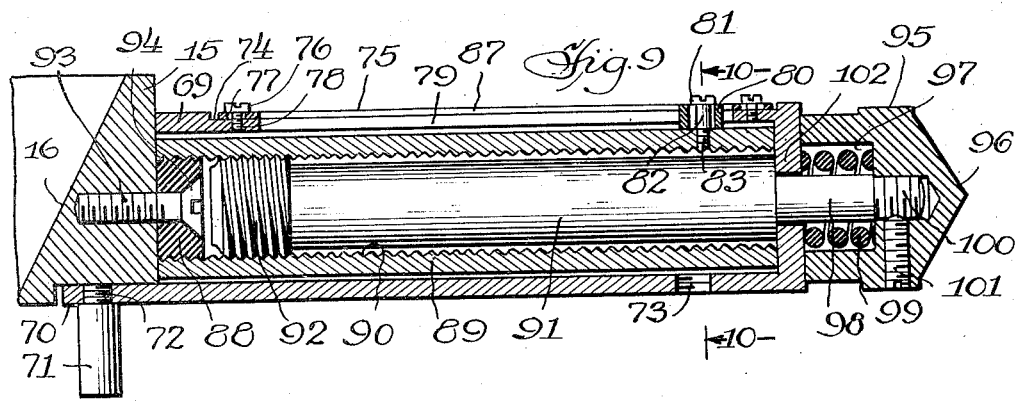
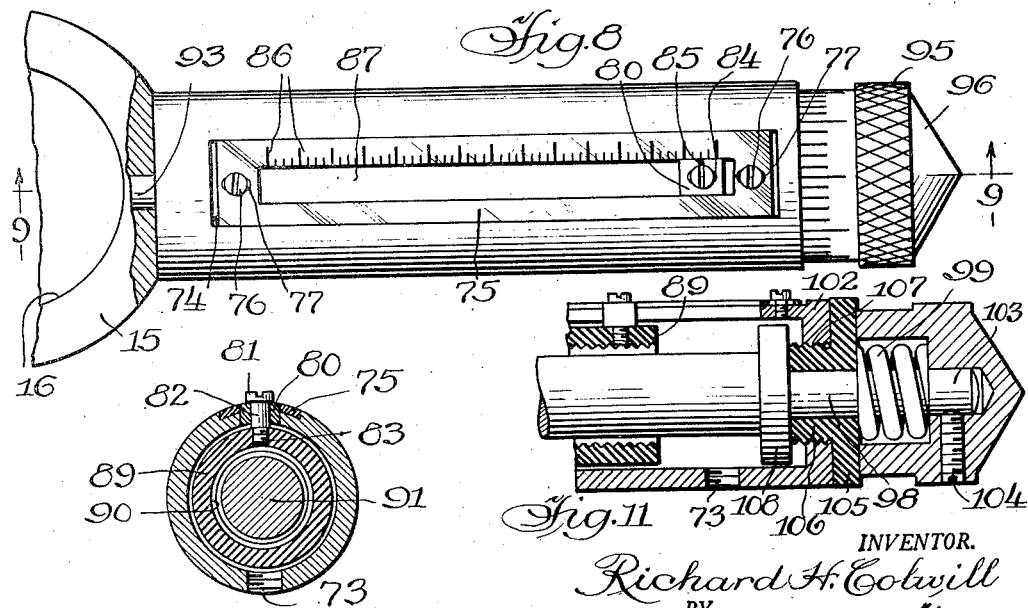
INVENTOR.
Richard H. Colwill
BY
David Manly Stellar
Attorney.

Patented Aug. 24, 1948

2,447,932

UNITED STATES PATENT OFFICE 2,447,932

CENTERIMETER

Richard H. Colwill, Chicago, Ill.

Application April 9, 1945, Serial No. 587,350

1 Claim. (Cl. 33—191)

My invention relates to instruments for locating the center of bored openings, at the same time providing a central point support for measuring instruments to be positioned therein for measurements to be "layed out" on a piece of work, or block of material, measurements both lineally or angularly relative to the central point of the said bored opening.

Another object of my invention is to provide a center locating tool of the aforementioned character which is graduated micrometrically and provided, preferably, with three locating arms which are set to the dimension of the bored opening, so that when the same is fitted into the bored opening, its central point of location will serve as a support for the positioning of scribing instruments, such as compasses, facilitating the "layout work" to be proceeded with.

Another object of my invention is to provide an attachment for an instrument of the aforementioned character, which is locatable and removably positioned in the center well of the center measuring instrument, and which is graduated to furnish protractor measurements of an angular range from zero to 360°.

Another object of my invention is to provide a three legged instrument, each leg micrometrically graduated, and the tip portion of each leg adapted to be positioned within an opening thereby increasing its range of measurement.

A still further object of my invention is to provide a removably interchangeable locating pin structure which may be positioned in any one of two locations, thus further increasing the range of measurement.

Another object of my invention is to provide an instrument of the foregoing character which is simple in construction, practical and efficient in its function and operation, and of such elemental construction as to lend itself readily to economical quantity production.

Other features and objects inherent in my invention will become apparent from an examination of the accompanying drawings, taken in conjunction with the ensuing description, wherein like symbols are used to designate like parts, and in which:

Fig. 1 shows a plan view of one form of my invention, positioned in a bored opening on a piece of work preparatory to "layout" work.

Fig. 2 is a front view of Figure 1, showing the work piece partly in section, in order to more clearly indicate the positioning of my instrument with respect to the bore therein.

Fig. 3 is a cross-sectional view taken, substantially, on the line 3—3 of Figure 1, showing my instrument enlarged, and showing how the extremities or tips of its leg portions may be used to span a much larger opening than is afforded by its range as governed by the gauging or locating pins 37.

Fig. 4 is a transversal cross-sectional view taken, substantially, on the line 4—4 of Figure 3.

Fig. 5 is a plan view of an accessory in the form of a protractor adapted to cooperatively fit the well portion of my center measuring instrument.

Fig. 6 is a front view of Figure 5.

Fig. 7 is a longitudinal cross-sectional view of a slightly modified form of my invention.

Fig. 8 is a plan view of another slightly modified form of my invention.

Fig. 9 is a longitudinal cross-sectional view taken, substantially, on the line 9—9 of Figure 8.

Fig. 10 is a transversal cross-sectional view taken, substantially, on the line 10—10 of Figure 9, and Fig. 11 is a longitudinal, fragmentary, cross-sectional view showing the form of Figures 8 and 9 slightly modified with an end bearing, or intermediate cap.

Referring to the various views, 12 represents, generally, a piece of work on which the instrument 13 is set for operation. The said instrument is made up of three legs 14 substantially spaced 120° apart on axis to axis measurement, each connected to a central hub portion 15, which has a conical recess 16 therein in order to demarcate the center of a bored opening when the gauging pins 37 are set to encompass or span tangentially the openings or bore 109 in the work piece 12.

The center 24 of the well 16 serves the purpose of permitting compasses or scribers 17 to have one of their legs positioned therein, and the operative leg to perform "laying-out" on the surface of the work piece or block 12. The legs in detail construction are shown in Figure 3, and are comprised of a bushing 25 which has a reduced threaded portion 27 secured to the hub 15, and held firmly yet locked in place by means of set screw 28. Within this bushing 25 there is a counter-bore 26 and a threaded portion to receive the screw 32, which is locked in place by the set screw 28. Within the counter-bore 26 is fitted a sleeve 31 which houses in working fit relationship the intermediate sleeve 34, having a headed portion 33 confined between the bottom of the bore 26 and the left hand end of the sleeve 31, the sleeve 31 being also confined in working rotatable fit relationship with the knob 41, which is secured to the threaded portion 40 of the intermediate sleeve 34, and locked in place by virtue of set screw 44.

The outer sleeve 31 is provided with two threaded openings 38 so as to receive locating or bore engaging pins 37 when in the position indicated in Figure 3. The range of adjustment of measurements extends to the reading or graduations 45 of the sleeve 25 or its surface 29. The surfaces 29 and 30 carry the graduations 45 and the indicator mark 46, respectively, for reading the measurements in thousandths or in ten thousandth parts of an inch. When placed in the right hand threaded portion 38, the pin 37 will span a greater distance increased by an increment equivalent to the center to center measurements between left hand and the right hand threaded openings 38.

It is to be noted that the intermediate sleeve 34 is provided with a threaded portion 35, and an enlarged clearance bore 36. The tip of the knob 41 is knurled at 47 and graduated and demarcated into twenty-five divisions each indicating one thousandth part of an inch, and aligning with the indicator mark 49. The operation of the knob is similar to micrometer measuring instrument construction, so that the graduations on the scale 45 each indicate twenty-five thousandths of an inch, each being further subdivided into unit thousandths on the dial 48. Rotation of the knob or cap 41 one complete turn causes the indicator 46 to move one division on the calibration 45 and thus the readings are, for each graduation 45, twenty-five thousandths of an inch, whereas for each graduation on the scale 48 the reading is one one-thousandth of an inch, and the instrument is read the same as a micrometer would be read.

The tip 42 further enhances the value of the measuring instrument, inasmuch as the range is increased to a greater distance and on the instrument or with instructions accompanying the said instrument, a certain standard will be indicated for the hole 38, as well as for the use of the tip 42, which standard, or measurement, will be added to the actual sum of the readings on the calibrations 45 and 48, respectively.

When the knob 41 is rotated, the threaded screw 32 being provided with forty threads per inch causes the indicator 46 to travel one division relative to the calibration 45, provided the knob is rotated clockwise, or when rotated counter-clockwise the indicator moves in the opposite direction. When the knob 41 is rotated clockwise, an observer looking from the leg end toward the center hub 15, that rotation causes the headed intermediate sleeve 34 to rotate therewith, which holds in confinement the outer sleeve 31 causing it to move together therewith; but the outer sleeve 31 because of the slotted portion 39 therein, will prevent the outer sleeve from rotating, because the pin 37 is located in this slot, and thus will cause the sleeve 30 to move outwardly, causing the indicator mark 46 to travel to the right, and when a counter-clockwise movement is used, the pin 37 will travel inwardly, and also the mark 46.

In order to utilize the instrument, the bore or opening diameter is first determined, then each leg is set to a radial measurement, or one half of the diameter measurement of the opening 109, which will cause the pins 37 to be equidistant from the center of the opening 109, and also from the center of the well 16, thus an outer lineal element of the cylindrical surface of the pin 37 will be in tangential relationship and contact with the side walls of the opening 109. When the tool is thus placed into the opening, the imaginary center of the opening 109 becomes co-axially aligned with the actual center of the well 16, so that instrument 17 may be positioned therein, and relative measurement therefrom inscribed or circumscribed on the surface of block 12 with reference to the opening 109.

The tips 42 are preferably hardened and ground, so that they may be effectively utilized without wear when placed in larger openings 43, of a piece of work, in which the instrument is to be used.

The views in Figures 5 and 6 show a 360° protractor, generally, designated 18, which has a top surface 19, and a formed conical well portion 20, having its opening 21 relatively congruent with the well 16, so as to frictionally engage therein, permitting the center 23 to be used for positioning the legs of instrument 17 therein, and the calibrations 22 running from zero to 360° may facilitate angular measurements and "layout" of measurements required on the surface of work piece 12.

In Figure 7, I use an outer sleeve 50 which has a threaded shank 51 to be threaded and secured to the hub 15 and held in locked engagement by virtue of set screw 53. The outer sleeve 50 has an internal threaded portion 52, substantially, thruout its effective working length, in which is fitted a headed bolt 58 having a threaded portion to fit within the thread of the outer sleeve 50, and provided with a reduced body portion 64, terminating in a threaded portion 65 to engage the cap or knob 61, and be firmly locked in place by the set screw 66. The knob 61 is suitably knurled at 62 and graduated at 63 from zero to twenty-five thus registering thousandths of an inch. The intermediate sleeve 59 is a working fit in between the confines of the edge 68 of the knob 61, and the inner edge 67 of the threaded head 58, the said sleeve 59 being also provided with threaded portions 56 and 57.

The pins 55 are secured interchangeably either to the threaded portion 56 or 57 thus increasing the span or range of adjustment, the said pins 55 operating slidably within the confines of the slot 54 in the outer sleeve 50 thus preventing the sleeve 59 from rotating. When the knob 62 is rotated, it rotates the threaded head 58 within the threaded portion of the outer sleeve 50, thus moving the same in or out, and moving the sleeve 59 in or out, the sleeve 59 being prevented from rotation because the pin 55 operates slidably in the slotted portion 54 of the outer sleeve 50 which is fixedly secured to the hub 15. This form is used in the same manner as elucidated for the form in Figures 1 to 4 heretofore described.

Figures 8 and 9 are similar in construction, but slightly modified, wherein the pins 71 are threaded into openings 72 or openings 73 in order to increase the range of adjustment, and the conical tip of the knob 96 of the rotating knob is also used in the self-same manner as illustrated in Figure 3. In this form, I provide an outer sleeve 69 which is secured to the hub 15 by virtue of its projection or extension 70 seating against a recess portion in the hub 15, and in which the pin 71 is also secured. The said sleeve is provided with a recess 79, and a counter-bore recess 74 in which is fitted the scale plate 75 which has the calibrations 86, each graduation being twenty-five thousandths of an inch apart from its adjacent graduation, the said scale 75 being adjustably positionable with respect to its elongated slot 77 and the screws 76, which have their threaded bodies 78 secured to threaded openings in the sleeve 69.

The indicator 80 is provided with a line of demarcation 85 which registers with the graduations 86 when it is aligned therewith, and the element 80 is likewise adjustably confined in the slot 87 by its slotted means 84, which permits lateral adjustment of the indicator bushing 80, held in place by the screw 81 and the intermediate shoulder 82, its threaded tip 83 being secured to the intermediate sleeve 89. The said sleeve 89 is provided with an internal thread of 40 pitch designated 90, in which the intermediate sleeve 89 is secured to a threaded plug 88, which in turn is held securely in place by the counter-sunk screw 94, having its body 93 threaded into the hub 15.

Within the threaded portion 90, operates a threaded head 92, which has a reduced body 91, and a further reduced shoulder extension 98, terminating in a threaded portion 100 to which the knob 96 is secured, and held firmly in place by the set screw 101. The knob 96 is also counter-bored at 97 in order to accommodate a resilient element, or spring 99, housed about the said shoulder 98, the sleeve 89 being confined between the bottom 102, or closed end 102 of the outer sleeve 69, thus the spring 99 offers suitable tensioning contact preventing dirt from entering into the working mechanism of the device. When the knob 96 is grasped by the knurled portion 95 and rotated, it will take therewith the inner element 91 which works its threaded head 92 in or out of the thread 90 of the intermediate sleeve 89, and thus causes the outer sleeve 69 to move along with it, because the indicator bushing 81 confines the intermediate sleeve 89 and prevents rotation thereof, thus the sleeve 69 moves outwardly with the pin 71 and the knob 96, and the device may be used in the self-same manner as the devices represented by the aforementioned and described forms of my invention.

It is to be noted, that the scale 75 and the indicator 80 both provide for relative adjustment for wear if that should be necessary, and the scale 75 may be easily replaced, or if the graduations are worn, or for any other reason removal should become necessary.

In the form indicated in Figure 11, the construction is exactly the same as in Figures 8 and 9 with the exception that the sleeve 69 is provided with a partially open end 102, having a threaded portion 107 therein to receive the threaded end 106 of the bushing 105, which is rotatably confined on the shank or extension 98, with the exception that the shank 98 in this instance has a smooth end 103 which is held in place, in assembly, with the knob by means of set screw 104. A spring 99 is also used in order to confine the said bushing frictionally and provide a dust-proof arrangement for the satisfactory operation of the unit. A shoulder, or a collar 108 may be used for seating the bushing 105.

Having thus disclosed and described my invention, what I claim as novel and desire to secure by Letters Patent, is:

A centerimeter comprising, a hub having a frusto-conical well at its mid-point, and at least three independently extensible and retractable leg locating means adapted to locate the said well concentrically with respect to an opening, the said locating means including, an outer sleeve secured to the said hub and provided with diametrically opposed slotted portions, one of said slotted portions provided with a calibrated scale of measurement, a threaded stud secured concentrically to the said outer sleeve, an inner sleeve rotatably engaging the said threaded stud, an intermediate sleeve mounted between the said outer and inner sleeves and provided with an indicator marking cooperating with the said calibrated scale, a locating pin element secured to the said intermediate sleeve and slidably operative in the other of said slotted portions in the said outer sleeve, and a cap element secured to one end of said inner sleeve and provided with a calibrated scale of measurement positioned at right angles to the said first mentioned scale and cooperating with an indicator demarcation on the adjacent end of said intermediate sleeve, the said conical well having its apex in the geometric plane of the top surface of the said opening.

RICHARD H. COLWILL.

REFERENCES CITED

The following references are of record in the file of this patent:

UNITED STATES PATENTS

| Number | Name | Date |
|---|---|---|
| 193,398 | Crandall | July 24, 1877 |
| 1,846,787 | Buchmuller | Feb. 23, 1932 |

FOREIGN PATENTS

| Number | Country | Date |
|---|---|---|
| 60,558 | Germany | Jan. 13, 1892 |
| 195,701 | Great Britain | Apr. 12, 1923 |